US009304186B2

(12) United States Patent
Amizur et al.

(10) Patent No.: US 9,304,186 B2
(45) Date of Patent: Apr. 5, 2016

(54) SYSTEM AND METHOD FOR CHANNEL FEEDBACK FOR LOCATION TIME OF FLIGHT

(71) Applicants: Yuval Amizur, Kfar-Saba (IL); Leor Banin, Petach Tikva (IL); Uri Schatzberg, kiryat ono (IL)

(72) Inventors: Yuval Amizur, Kfar-Saba (IL); Leor Banin, Petach Tikva (IL); Uri Schatzberg, kiryat ono (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,390

(22) PCT Filed: Sep. 18, 2013

(86) PCT No.: PCT/US2013/060400
§ 371 (c)(1),
(2) Date: Dec. 18, 2013

(87) PCT Pub. No.: WO2014/168649
PCT Pub. Date: Oct. 16, 2014

(65) Prior Publication Data
US 2015/0168537 A1 Jun. 18, 2015

Related U.S. Application Data

(60) Provisional application No. 61/810,325, filed on Apr. 10, 2013.

(51) Int. Cl.
*H04W 24/00* (2009.01)
*H04W 4/00* (2009.01)
*G01S 5/10* (2006.01)
*G01S 13/76* (2006.01)
*H04L 25/02* (2006.01)
*H04W 4/02* (2009.01)
*H04W 64/00* (2009.01)
(Continued)

(52) U.S. Cl.
CPC ............... *G01S 5/10* (2013.01); *G01S 13/767* (2013.01); *H04L 25/0202* (2013.01); *H04L 27/2613* (2013.01); *H04W 4/023* (2013.01); *H04W 64/00* (2013.01); *H04W 84/12* (2013.01)

(58) Field of Classification Search
None
See application file for complete search history.

(56) References Cited

U.S. PATENT DOCUMENTS 6,553,013 B1 * 4/2003 Jones et al. ............... 370/328
7,302,269 B1 * 11/2007 Crawford et al. ......... 455/456.1
(Continued)

FOREIGN PATENT DOCUMENTS

CN 104246532 A 12/2014
WO WO-2014168649 A1 10/2014

OTHER PUBLICATIONS

"International Application Serial No. PCT/US2013/060400, International Search Report mailed Jan. 16, 2014", 3 pgs.
(Continued)

*Primary Examiner* — Erika A Washington
(74) *Attorney, Agent, or Firm* — Schwegman Lundberg & Woessner, P.A.

(57) ABSTRACT

A method and system for time-of-flight (ToF) positioning in an IEEE 802.11 network comprises a responder station to transmit samples of preambles as the preambles are received. The samples represent channel information. The preambles comprise extension high-throughput long training fields (HT-LTFs). An initiator station is arranged to perform a time-of-arrival calculation based at least in part on an analysis of the channel information.

16 Claims, 4 Drawing Sheets

(51) Int. Cl.
*H04L 27/26* (2006.01)
*H04W 84/12* (2009.01)

(56) References Cited

U.S. PATENT DOCUMENTS

| | | |
|---|---|---|
| 2005/0002481 A1 | 1/2005 | Woo et al. |
| 2007/0184864 A1 | 8/2007 | Leitch et al. |
| 2010/0156660 A1 | 6/2010 | Lee et al. |
| 2010/0238872 A1 | 9/2010 | Kim et al. |
| 2012/0244880 A1 | 9/2012 | Lee et al. |

OTHER PUBLICATIONS

"International Application Serial No. PCT/US2013/060400, Written Opinion mailed Jan. 16, 2014", 7 pgs.

* cited by examiner

SYSTEM AND METHOD FOR CHANNEL FEEDBACK FOR LOCATION TIME OF FLIGHT

PRIORITY APPLICATION

This application is a U.S. National Stage Application under 35 U.S.C. 371 from International Application No. PCP/US2013/060400, filed Sep. 18, 2013, which is hereby incorporated by reference in its entirety.

This application claims the benefit of priority to U.S. Provisional Ser. No. 61/810,325, filed Apr. 10, 2013, which is incorporated herein by reference in its entirety.

TECHNICAL FIELD

Embodiments pertain to wireless network communications. Some embodiments relate to the IEEE 802.11 standards. Some embodiments relate to WiFi networks. Some embodiments relate to beamforming. Some embodiments relate to channel feedback, location positioning, and time-of-flight (ToF).

BACKGROUND

Outdoor navigation is widely deployed through the use of various global-navigation-satellite-systems (GNSS) such as the U.S. Global Positioning System (GPS), the Russian Global Navigation Satellite System (GLONASS), and the European GALILEO. These systems may operate effectively outdoors but, due to satellite reception problems, may not be very effective indoors.

Relatively recently, there has been a focus on solving indoor navigation problems. One solution may be based on Time-of-Flight (ToF) positioning methods. Time-of-Fight may be defined as the overall time a signal propagates from a mobile communication station (e.g., user) to an access point (AP) and back to the user. This value may then be converted into distance by dividing the time by two and multiplying the result by the speed of light. This method may be robust and scalable but may require hardware changes to the Wi-Fi modem.

There are general needs for performing indoor navigation out of range of the GNSS.

DESCRIPTION OF EMBODIMENTS

Subsequently described embodiments refer to WiFi communication systems and Institute of Electrical and Electronics Engineers (IEEE) 802.11 (i.e., a set of physical layer standards for implementing wireless local area network (WLAN) computer communication). However, the present embodiments are not restricted to only a WiFi communication system or any particular communication standard. The present embodiments may be used in any communication system in which location and navigation capabilities may be desired.

Time-of-Flight (ToF) positioning methods may provide a way to determine a mobile station's location in an environment where GNSS may not be available (e.g., indoors). Typical ToF methods may pose a barrier to entry since only those manufacturers having both navigation and WiFi internet protocol (IP) addresses may implement this kind of solution.

In present communication systems, two wireless communication stations may calculate a time-of-arrival (ToA) independently in order to perform a WiFi distance measurement. Each station may combine a Time of Arrival (ToA) of a frame with the Time of Departure (ToD) of the frame in order to determine a round trip time between the stations. Multiplying the round trip time by the speed of light and dividing by two may result in a distance from a station.

The ToA calculation may be based on an analysis of channel information. The channel information refers to known channel properties of a communication link. The channel information may describe how a signal propagates from a transmitter to a receiver and may represent the combined effects of, for example, scattering, fading, and power decay with distance. The channel information may be described as a snapshot of the channel at a particular time, since the channel information may change as a mobile station moves about an area. Thus, new channel information may be used during each ToA calculation.

Each station independently performing its own ToA analysis may introduce errors into the calculations due to only one side of the channel being taken into account. These errors may result in tens of meters of variation.

The present embodiments of a method for channel feedback for location ToF and beam forming may result in both sides of the channel being taken into account during ToF calculations. In such an embodiment, an initiating station (e.g., initiator) may send a frame to a responding station (e.g., responder). The responder may then reply to the initiator with at least a portion of the frame. The initiator may then use that feedback information to determine channel information for both sides of the channel in its ToF calculations. Thus, the ToF calculations may be performed on only one side of the channel. The feedback information may also be used in beamforming.

Figure 1:
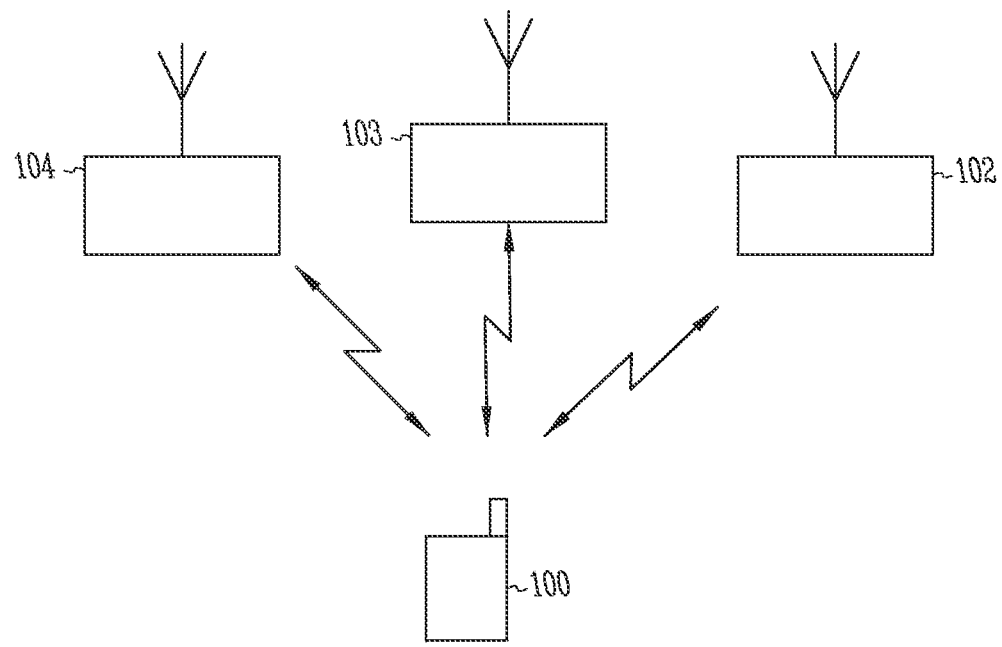
FIG. 1 illustrates a block diagram of an embodiment of a wireless communication system in accordance with some embodiments.

FIG. 1 illustrates various network elements of a wireless communication network in accordance with some embodiments. The wireless communication network includes one or more wireless communication stations 100, 102-104 that may include a mobile wireless station 100 and a plurality of access points (APs) 102-104 that may communicate over one or more wireless channels in accordance with IEEE 802.11 communication techniques.

The mobile wireless station 100 may be a mobile communication device that is non-stationary. Such a communication device may include mobile radiotelephones, tablet computers, lap top computers, and other communication devices that may communicate with the access points 102-104 over one or more wireless channels using a communication technique (e.g., IEEE 802.11).

The access points 102-104 may have fixed locations. The access points 102-104 may be part of a stationary network that may be coupled to a larger network (e.g., local area network (LAN), wide area network (WAN)). For example, the access points 102-104 may be part of a wired network that is coupled to the Internet. The mobile wireless station 100 may then access the larger network by communicating over the wireless channels with the access points 102-104.

It may be desirable for the mobile wireless station 100 to know its location with relation to the access points 102-104. Since the geographical locations of the access points 102-104 are fixed and known, the geographical location of the mobile wireless station 100 may be determined by trilateration and tracked thereafter. The trilateration may be accomplished by using ToF calculations.

Figure 2:
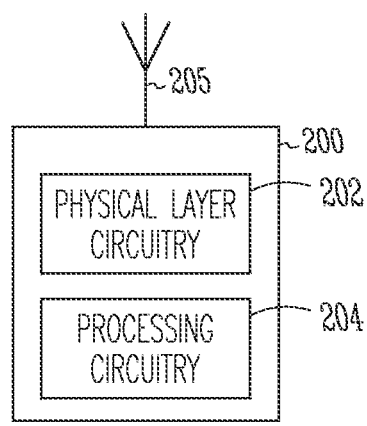
FIG. 2 illustrates a block diagram of an embodiment of a wireless communication station in accordance with some embodiments.

FIG. 2 is a functional block diagram of a wireless communication station in accordance with some embodiments. Communication station 200 may be suitable for use as a mobile wireless communicator 100 (FIG. 1) or any of the access points 102-104 (FIG. 1), although other configurations may also be suitable.

Communication station 200 may include physical layer circuitry 202 to communicate wirelessly with access points, mobile communication devices, and other communication stations over one or more antennas 205. Communication station 200 may also include processing circuitry 204 coupled to the physical layer circuitry 202 to perform other operations described herein.

In accordance with embodiments, the physical layer circuitry 202 may be configured to transmit and receive ToF messages between communication stations. The physical layer circuitry 202 may also be configured to transmit and receive acknowledgments as well as other communications between communication stations. The physical layer circuitry 202 may be configured to modulate digital data from the processing circuitry 204 for transmission over a channel as well as demodulate received modulated signals into digital data for use by the processing circuitry 204.

In accordance with embodiments, the processing circuitry 204 may be configured to calculate ToF measurements. The processing circuitry 204 may also be configured to calculate time intervals such as ToA and ToD.

Although communication station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of communication station 200 may refer to one or more processes operating on one or more processing elements.

In some embodiments, communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, a communication station may include one or more of a keyboard, a display, a non-volatile memory port, multiple antennas, a graphics processor, an application processor, speakers, and other mobile device elements. The display may be an LCD or LED screen, including a touch screen.

Figure 3:
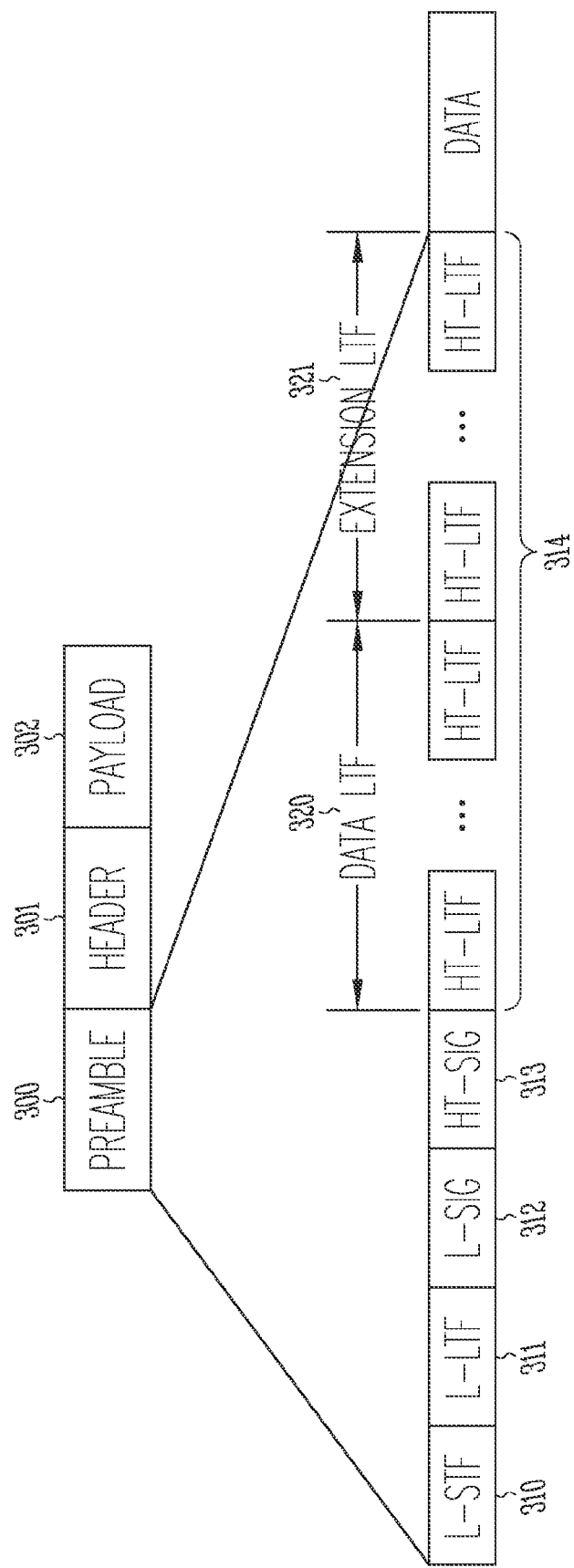
FIG. 3 illustrates a diagram of an embodiment of a frame structure in accordance with some embodiments.

The wireless communication stations 100, 102-104 in the network may communicate with each other over the one or more wireless channels using a frame structure. Some embodiments may also refer to the frame as a packet. FIG. 3 illustrates one embodiment of such a frame structure that may be used in one or more standards of IEEE 802.11.

The basic frame structure may include a preamble 300, header 301, and payload 301. The preamble 300 may include numerous sub-fields 310-314, as described subsequently, and may serve to alert a receiver of a wireless communication station 100, 102-104, such as a radio, that a transmission is about to start. The preamble 301 then enables the receiver to synchronize with the incoming transmission using a plurality of training sub-fields 314.

The header 301 may immediately follow the preamble 300 in the frame. The header 301 may include information regarding the payload 302 to follow including the length of the data within the payload 302.

The payload 302 may include the data that may be desired to be transferred to another wireless communication station 100, 102-104. In the IEEE 802.11 standards, the payload may range from 64-1500 bytes. Other embodiments may have different size payloads. The payload 302 may be modulated using the same modulation scheme as the preamble 300 and header 301 or a different modulation scheme may be used.

The preamble 300 may include numerous sub-fields 310-314. For example, the preamble 300 may include numerous legacy fields 310-312 that may be used in older versions of a communication standard (e.g., 802.11a/g). Such legacy sub-fields 310-312 may enable communication with both wireless communication stations using new standards as well as wireless communication stations using the older standards.

The legacy sub-fields 310-312 may include training fields such as a legacy short training field (L-STF) 310 and a legacy long training field (L-LTF) 311. The legacy sub-fields 310-312 may further include a legacy signal field (L-SIG) 312 that may be used to transfer a rate and length information of the frame.

Other preamble sub-fields 310-314 may include a high throughput signal field (HT-SIG) 313 that may provide means to carry information used to interpret HT packet formats. A plurality of high throughput long training fields (HT-LTF) 314 may provide means for the receiver to estimate the channel between each antenna.

The HT-LTF 314 subfields, in the present embodiments, may comprise one or more portions. The first portion 320 may be referred to as data HT-LTF's and the second portion 321 may be referred to as extension HT-LTF's.

The data HT-LTF sub-fields 320 may be used for demodulation of a high throughput data portion of the payload 302. This portion 320 may comprise one or more sub-fields and may be located immediately adjacent to the HT-SIG field 313.

The extension HT-LTF sub-fields 321 may be used for probing extra spatial dimensions of the channel that may not be utilized by the HT-LTF data portion 320. This portion 321 may comprise one or more sub-fields and may be located immediately after the data HT-LTF data portion 320 and prior to the payload data.

In an embodiment of the method for channel feedback for location ToF and beam forming between an initiator and a responder, the responder may transmit back to the initiator samples of the preamble 300 exactly as they are received without any processing by the responder. For example, the method might transmit back the extension HT-LTF sub-fields as the feedback. Since the initiator has its own channel estimation of the channel information between the responder and the initiator, it can recover the channel as the responder has seen it. Conventionally, the channel may not be sent back. In the case of explicit beam forming, the needed channel information may be sent via the regular data bits with overhead data. One example of a protocol flow for ToF distance measurement is illustrated in FIG. 4.

Figure 4:
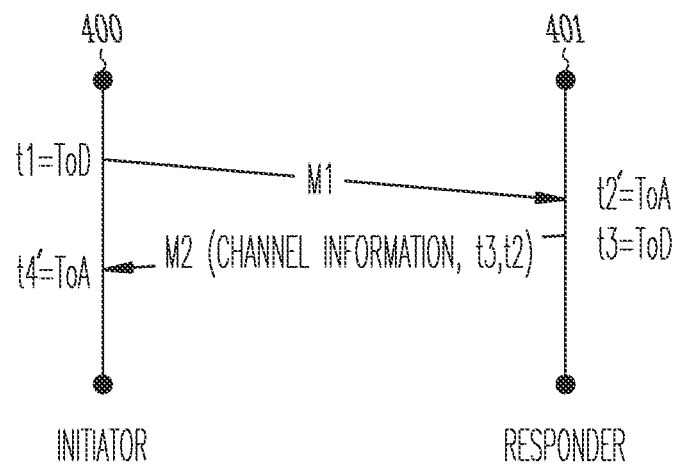
FIG. 4 illustrates a protocol flow for ToF distance measurement in accordance with some embodiments.

FIG. 4 shows the initiator 400 and the responder 401. The initiator 400 may be any wireless communication station that desires to determine its location with respect to one or more other stations. The initiator 400 may be either the mobile wireless station 100 or the AP 102-104.

The responder 401 may be any wireless communication station that responds to the initial ToF measurement request from the initiator 400. The responder 401 may be either the mobile wireless station 100 or the AP 102-104.

The initiator 400 may transmit frame M1 (e.g., ToF measurement request frame) over the channel to the responder 401. The request frame M1 may be a measurement request frame requesting a ToF response from the responder 401 in order for the initiator 400 to determine its location with respect to the responder 401. The time of departure (ToD) from the initiator 400 may be labeled as t1.

Figure 5:
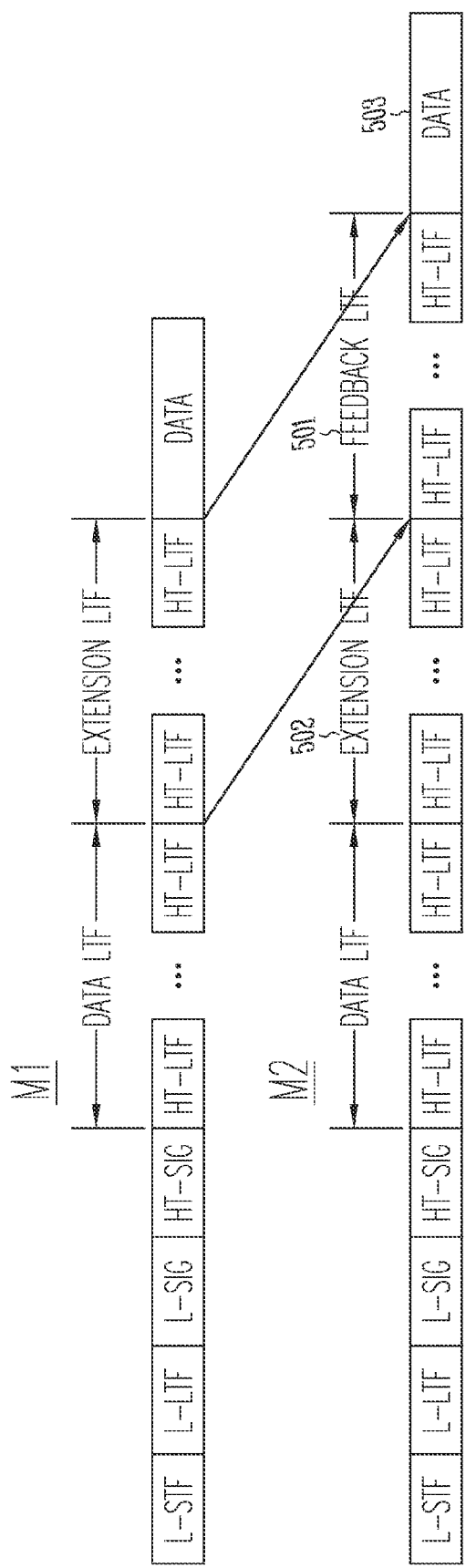
FIG. 5 illustrates one embodiment of frame implementations in accordance with some embodiments.

One embodiment of the structure of frame M1 is illustrated in FIG. 5. The structure of frame M1 may substantially correspond to the frame structure illustrated in FIG. 3 and described previously.

The responder 401 may then receive the frame M1 at the ToA=t2. The ToA of t2 is the symbol received time at the responder 401. The t2 time may not include the channel effects (e.g., multipath) on the received time. In other words, the symbol received time t2 might not be the first path of the channel that has arrived inside the symbol. The time used by the initiator 400 to determine the ToF calculations is subsequently referred to as t2'. The t2' time may be determined by the initiator 400 in response to the channel information from the initiator 400 to the responder 401.

The responder 401 receives the frame M1 in an analog format since the initiator 400 modulated the digital data for transmission over the channel. The responder 401 samples M1 to remove a modulated symbol of the M1 frame to be used as feedback. In an embodiment, the responder 401 samples the M1 frame to remove an extension HT-LTF symbol as the feedback symbol. This may be referred to as the feedback extension HT-LTF symbol. The feedback extension HT-LTF is demodulated but not processed. Thus, without processing (e.g., demapping, error correction) this symbol, the responder 401 adds the symbol to a response frame M2 as shown in FIGS. 4 and 5. The response frame M2 is modulated and transmitted over the channel at a ToD=t3 from the responder 401. The initiator 400 may then receive the response frame M2 at a symbol received ToA=t4. As in the time t2, t4 represents the time the symbol was received and may not represent the time of arrival of the first path of the channel. The time used by the initiator 400 to determine the ToF calculations is subsequently referred to as t4'. The t4' time may be determined by the initiator 400 in response to the channel information from the responder 401 to the initiator 400.

FIG. 5 shows the resulting format of the response frame M2 with the feedback extension HT-LTF symbol. This symbol is referred to in FIG. 5 as the feedback LTF field 501. The feedback LTF field 501 may be located between the extension LTF field 502 and the data 503 of M2.

FIG. 4 shows that the response frame M2 to the initiator 400 also comprises channel information and the times t2 and t3. In an embodiment, the channel information may include the unprocessed, feedback extension HT-LTF symbol as discussed previously.

The response frame M2 may then be demodulated by the initiator 400 and the transmitted data extracted. The initiator 400 may then determine t2' in response to the determined channel information of the channel from the initiator 400 to the responder 401. The initiator 400 may also now determine t4' in response to the estimated channel information of the channel from the responder 401 to the initiator 400.

By subtracting the times t2' and t3, the initiator 400 may determine a time between when the responder 401 received M1 and when it transmitted M2. The initiator 400 may then remove this time from its calculation of the round trip time between the initiator 400 and the responder 401. The round trip time between the initiator 400 and the responder 401 may then be determined by first subtracting t1 from t4' then removing the delay at the responder 401 by subtracting the difference between t3 and t2'. For example, the round trip time may be expressed as (t4'−t1)−(t3−t2'). With the round trip time known, the initiator 400 may calculate the ToF distance by multiplying by the speed of light and dividing the result by two.

Since all receivers in a wireless system may have a channel estimation of a communication channel, the initiator 400 may then use its channel estimation of the channel information between the responder 401 and the initiator 400 in order to remove the channel distortion caused during the transmission of M2 over the channel. The initiator 400 may determine the estimation of the channel information between the responder 401 and the initiator 400 by determining the distortion caused by the channel on the extension HT-LTF fields sent by the responder 401 to the initiator 400 in the preamble of the response frame M2 (i.e., see FIG. 5).

Once the channel information of the channel from the responder 401 to the initiator 400 is determined, the initiator may recover the feedback extension HT-LTF symbol as it was received by the responder 401 by removing the channel distortion from the feedback extension HT-LTF. In other words, the recovered feedback extension HT-LTF now appears to the initiator 400 as it was received by the responder 401. Thus, the initiator 400 may now have the channel information for the channel between initiator 400 and the responder 401. The initiator 400 may now use that channel information along with the round trip time determined previously in order to perform the ToF calculations to determine a range from the initiator 400 to the responder 401. Thus, all of the ToF calculations may be performed on one side of the channel (e.g., by the initiator).

Transmit beam forming enables a wireless communication station to steer an outgoing signal stream towards an intended receiver. Thus, in the method for channel feedback for location ToF and beam forming, the responder 401 may use the feedback of the preamble sample (e.g., feedback extension HT-LTF's), as described previously, to also perform beam forming with the initiator 400.

Each wireless communication station 100, 102-104 having multiple antennas may transmit a different extension HT-LTF portion from each antenna. Thus, the initiator 401 may transmit M1 from each of its antennas such that M1 has a different extension HT-LTF portion in each transmitted M1. Since the responder 401 samples the extension HT-LTF portion from M1 and embeds this extension HT-LTF portion into M2, the initiator 400 can determine from the returned sample from which initiator antenna the responder 401 has correctly received the M1 frame.

In another embodiment, instead of the responder 401 transmitting the sampled extension HT-LTF back to the initiator 400 without modifications, the responder 401 may reconstruct the cyclic prefix prior to sending the extension HT-LTF back to the initiator 400. In an embodiment, the responder 401 may use approximately 3.2 μsec to perform this operation. The cyclic prefix may be data added to the beginning of the data field of the symbol and is a replica of the end of the data. The cyclic prefix may be used to mitigate interference from adjacent symbols.

In another embodiment, the sampled extension HT-LTF may be transmitted back to the initiator multiple times in order to reduce noise effects on the channel between the responder 401 and the initiator 400. This may be accomplished by transmitting multiple M2 frames or placing the sampled extension HT-LTF multiple times in the one M2 sent from the responder 401 to the initiator 400.

In another embodiment, the responder 401 may reverse its own channel and reconstruct the extension HT-LTF feedback as the responder 401 has received it. This may be accomplished by the responder 401 estimating the channel and performing an equalization of the channel.

In another embodiment, the initiator 400 may analyze the feedback extension HT-LTF as received since it contains a composite of both channels (i.e., initiator to responder and responder to initiator). In determining location of the initiator 400, the first path between the initiator and responder may be identified.

In another embodiment, explicit beam forming may use a neighbor discovery protocol scheme. In explicit beam forming, the initiator 400 may transmit a null data packet (NDP) to the responder 401. The responder 401 may estimate multiple in and multiple out channels based on received extension HT-LTF's and transmits the output back to the initiator 400. The responder 401 may transmit the feedback extension HT-LTF to the initiator 400 instead of transmitting the channel information itself as may be done in the prior art.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

EXAMPLES

The following examples pertain to further embodiments.

Example 1 is a method for time-of-flight (ToF) positioning in a wireless network, the method comprising: transmitting a request frame over a channel from an initiator to a responder, receiving a response frame from the responder, the response frame comprising a feedback symbol sampled from the request frame and not processed by the responder, and determining channel information of the channel from the initiator to the responder in response to the feedback symbol.

In Example 2, the subject matter of Example 1 can optionally include the initiator determining a channel estimation of channel information of a channel from the responder to the initiator; and determining ToF positioning with respect to the responder in response to the channel information of the channel from the initiator to the responder and the channel information of the channel from the responder to the initiator.

In Example 3, the subject matter of Example 2 can optionally include determining a round trip time between the initiator and the responder by: determining a difference in time between transmitting the request frame and receiving the response frame in response to the channel information of the channels from the initiator to the responder and from the responder to the initiator; and subtracting a delay at the responder from the difference in time between transmitting the request frame and receiving the response frame.

In Example 4, the subject matter of Example 1 can optionally include the initiator determining a channel estimation of channel information between the responder and the initiator.

In Example 5, the subject matter of Example 4 can optionally include determining the channel information of the channel from the initiator to the responder comprises removing channel distortion from the response frame in response to the channel estimation of the channel information between the responder and the initiator.

In Example 6, the subject matter of Example 1 can optionally include receiving the response frame comprising: the feedback symbol, a time of arrival of the request frame at the responder, and a time of departure of the response frame from the responder.

In Example 7, the subject matter of Example 1 can optionally include receiving a feedback extension high throughput long training field (IT-LTF).

In Example 8, the subject matter of Example 7 can optionally include wherein the feedback extension HT-LTF represents partial channel estimation information and the subject matter further includes: the initiator recovering the channel information of the channel from the initiator to the responder; determining channel information for a channel from the responder to the initiator; and improving the ToF positioning in response to the channel information of the channel from the initiator to the responder and the channel information for the channel from the responder to the initiator.

In Example 9, the subject matter of Example 8 can optionally include receiving a plurality of response frames from the responder, each of the plurality of response frames comprising the feedback symbol sampled from the request frame and not processed by the responder.

Example 10 is a system for time-of-flight (ToF) positioning in an IEEE 802.11 network, the system comprising: an initiator station to transmit a ToF measurement request frame to a responder station, receive a response frame from the responder station that includes channel information from the ToF measurement request frame, receive a preamble representing channel information from the responder station, perform a time of arrival calculation based at least in part on an analysis of the channel information from the ToF measurement request frame and the channel information from the responder station.

In Example 11, the subject matter of Example 10 can optionally include wherein the initiator station is a mobile wireless station.

In Example 12, the subject matter of Example 10 can optionally include wherein the responder station is an access point coupled to a wired network.

In Example 13, the subject matter of Example 10 can optionally include wherein the preamble comprises extension high-throughput long training fields (IT-LTFs).

In Example 14, the subject matter of Example 10 can optionally include wherein the initiator station is further to perform the ToF positioning in response to a time of departure of the ToF measurement request frame, a time of arrival (ToA) at the responder station of the ToF measurement request frame, a time of departure (ToD) of the response frame, and the time of arrival calculation.

Example 15 is a non-transitory computer-readable storage medium that stores instructions for execution by processing circuitry of an initiating station to perform operations to determine a location with respect to a responding station using time of flight (ToF) results, the operations to configure the initiating station to: transmit a ToF measurement request frame to the responding station; receive a response frame from the responding station wherein the response frame comprises a preamble that includes a sample from the ToF measurement request frame that has not been processed by the responding station; and determine a ToF position with respect to the responding station at least partially in response to the sample and the preamble of the response frame.

In Example 16, the subject matter of Example 15 can optionally include wherein the operations further configure the initiating station to: receive extension high-throughput long training fields (HT-LTFs) from the responding station in the preamble; estimate first channel information of the channel between the responding station and the initiating station; remove channel distortion from the response frame in response to the estimated channel information to determine second channel information of the channel between the initiating station and the responding station; and calculate the ToF position with respect to the responding station in response to the first channel information and the second channel information.

In Example 17, the subject matter of Example 16 can optionally include wherein the operations further configure the initiating station to: calculate the ToF position with respect to the responding station in response to the first channel information, the second channel information, a time of departure of the ToF measurement request frame, a time of arrival of the ToF measurement request frame at the responding station as determined by the second channel information, a time of departure of the response frame from the responding station, and a time of arrival of the response frame at the initiating station as determined by the first channel information.

In Example 18, the subject matter of Example 15 can optionally include wherein the operations further configure the initiating station to: receive the response frame with the sample, the time of arrival of the ToF measurement request frame at the responding station, and the a time of departure of the response frame from the responding station.

In Example 19, the subject matter of Example 15 can optionally include wherein the operations further configure the initiating station to: receive the response frame with the sample as part of the preamble.

In Example 20, the subject matter of Example 19 can optionally include wherein the operations further configure the initiating station to: receive the response frame with the modulated sample as a feedback extension high-throughput long training fields (HT-LTFs) that are located between the extension HT-LTFs and the payload in the response frame.

Example 21 is a method for time-of-flight (ToF) positioning in a wireless network, the method comprising: receiving a request frame over a channel from an initiator to a responder; sampling the request frame to extract a modulated symbol from the request frame; and transmitting the modulated symbol back to the initiator in a response frame.

In Example 22, the subject matter of Example 21 can optionally include extracting an extension high throughput Long Training Field (HT-LTF) from the request frame.

In Example 23, the subject matter of Example 22 can optionally include extracting a modulated extension HT-LTF from the request frame.

In Example 24, the subject matter of example 22 can optionally include adding the modulated extension HT-LTF to a feedback field in the response frame; and transmitting the response frame over a channel between a responder and the initiator.

In Example 25, the subject matter of Example 24 can optionally include adding to the response frame the modulated symbol, a time of arrival of the request frame at a responder, and a time of departure of the response frame to the initiator.

In Example 26, the subject matter of Example 25 can optionally include the initiator determining a channel estimation of a channel between the responder and the initiator.

Example 27 is a mobile wireless station for operating in an IEEE 802.11 network. The station comprises processing circuitry to control operation of the mobile wireless station including generation of transmit and receive ToF messages; and physical layer circuitry to transmit and receive the ToF messages between communication stations, the physical layer circuitry to transmit a request frame over a channel to a responding station, receive a response frame from the responding station, the response frame comprising a feedback symbol sampled from the request frame and not processed by the responding station, and determine channel information of the channel from the initiator to the responder in response to the feedback symbol.

In Example 28, the subject matter of Example 27 can optionally include wherein the processing circuitry is further to remove channel distortion from the response frame in response to a channel estimation of the channel information.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A method for time-of-flight (ToF) positioning in a wireless network, the method comprising:
   transmitting a request frame over a channel from an initiator to a responder;
   receiving a response frame from the responder, the response frame comprising a feedback symbol sampled from the request frame and not processed by the responder;
   determining channel information of the channel from the initiator to the responder in response to the feedback symbol;
   the initiator determining a channel estimation of channel information of a channel from the responder to the initiator;
   determining ToF positioning with respect to the responder in response to the channel information of the channel from the initiator to the responder and the channel information of the channel from the responder to the initiator; and
   determining a round trip time between the initiator and the responder by:
      determining a difference in time between transmitting the request frame and receiving the response frame in response to the channel information of the channels from the initiator to the responder and from the responder to the initiator; and
      subtracting a delay at the responder from the difference in time between transmitting the request frame and receiving the response frame.

2. A method for time-of-flight (ToF) positioning in a wireless network, the method comprising:
- transmitting a request frame over a channel from an initiator to a responder;
- receiving a response frame from the responder, the response frame comprising a feedback symbol sampled from the request frame and not processed by the responder;
- determining channel information of the channel from the initiator to the responder in response to the feedback symbol; and
- the initiator determining a channel estimation of channel information between the responder and the initiator;
- wherein determining the channel information of the channel from the initiator to the responder comprises removing channel distortion from the response frame in response to the channel estimation of the channel information between the responder and the initiator.

3. The method of claim 2 wherein receiving a response frame from the responder, the response frame comprising a feedback symbol sampled from the request frame and not processed by the responder comprises receiving the response frame comprising: the feedback symbol, a time of arrival of the request frame at the responder, and a time of departure of the response frame from the responder.

4. A method for time-of-flight (ToF) positioning in a wireless network, the method comprising:
- transmitting a request frame over a channel from an initiator to a responder;
- receiving a response frame from the responder, the response frame comprising a feedback symbol sampled from the request frame and not processed by the responder; and
- determining channel information of the channel from the initiator to the responder in response to the feedback symbol;
- wherein receiving the response frame from the responder, the response frame comprising the feedback symbol sampled from the request frame and not processed by the responder comprises receiving a feedback extension high throughput long training field (HT-LTF).

5. The method of claim 4 wherein the feedback extension HT-LTF represents partial channel estimation information and the method further comprising:
- the initiator recovering the channel information of the channel from the initiator to the responder;
- determining channel information for a channel from the responder to the initiator; and
- improving the ToF positioning in response to the channel information of the channel from the initiator to the responder and the channel information for the channel from the responder to the initiator.

6. The method of claim 5 and further comprising receiving a plurality of response frames from the responder, each of the plurality of response frames comprising the feedback symbol sampled from the request frame and not processed by the responder.

7. A system for time-of-flight (ToF) positioning in an IEEE 802.11 network, the system comprising:
- an initiator station to transmit a ToF measurement request frame to a responder station, receive a response frame from the responder station that includes channel information from the ToF measurement request frame, receive a preamble representing channel information from the responder station, perform a time of arrival calculation based at least in part on an analysis of the channel information from the ToF measurement request frame and the channel information from the responder station wherein the preamble comprises extension high-throughput long training fields (HT-LTFs).

8. The system of claim 7 wherein the initiator station is a mobile wireless station.

9. The system of claim 7 wherein the responder station is an access point coupled to a wired network.

10. The system of claim 7 wherein the initiator station is further to perform the ToF positioning in response to a time of departure of the ToF measurement request frame, a time of arrival (ToA) at the responder station of the ToF measurement request frame, a time of departure (ToD) of the response frame, and the time of arrival calculation.

11. A non-transitory computer-readable storage medium that stores instructions for execution by processing circuitry of an initiating station to perform operations to determine a location with respect to a responding station using time of flight (ToF) results, the operations to configure the initiating station to:
- transmit a ToF measurement request frame to the responding station;
- receive a response frame from the responding station wherein the response frame comprises a preamble that includes a sample from the ToF measurement request frame that has not been processed by the responding station;
- determine a ToF position with respect to the responding station at least partially in response to the sample and the preamble of the response frame;
- receive extension high-throughput long training fields (HT-LTFs) from the responding station in the preamble;
- estimate first channel information of the channel between the responding station and the initiating station;
- remove channel distortion from the response frame in response to the estimated channel information to determine second channel information of the channel between the initiating station and the responding station; and
- calculate the ToF position with respect to the responding station in response to the first channel information and the second channel information.

12. The non-transitory computer-readable storage medium of claim 11 wherein the operations further configure the initiating station to:
- calculate the ToF position with respect to the responding station in response to the first channel information, the second channel information, a time of departure of the ToF measurement request frame, a time of arrival of the ToF measurement request frame at the responding station as determined by the second channel information, a time of departure of the response frame from the responding station, and a time of arrival of the response frame at the initiating station as determined by the first channel information.

13. The non-transitory computer-readable storage medium of claim 11 wherein the operations further configure the initiating station to:
- receive the time of arrival of the ToF measurement request frame at the responding station, and the a time of departure of the response frame from the responding station.

14. A non-transitory computer-readable storage medium that stores instructions for execution by processing circuitry of an initiating station to perform operations to determine a location with respect to a responding station using time of flight (ToF) results, the operations to configure the initiating station to:

transmit a ToF measurement request frame to the responding station:
receive a response frame from the responding station wherein the response frame comprises a preamble that includes a sample from the ToF measurement request frame that has not been processed by the responding station;
determine a ToF position with respect to the responding station at least partially in response to the sample and the preamble of the response frame; and
receive the response frame with the sample as part of the preamble.

15. The non-transitory computer-readable storage medium of claim 14 wherein the operations further configure the initiating station to:
receive the response frame with the modulated sample as a feedback extension high-throughput long training fields (HT-LTFs) that are located between the extension HT-LTFs and the payload in the response frame.

16. A mobile wireless station for operating in an IEEE 802.11 network, the station comprising:

processing circuitry to control operation of the mobile wireless station including generation of transmit and receive ToF messages and to remove channel distortion from a response frame in response to a channel estimation of channel information; and physical layer circuitry to transmit and receive the ToF messages between communication stations, the physical layer circuitry to transmit a request frame over a channel to a responding station, receive the response frame from the responding station, the response frame comprising a feedback symbol sampled from the request frame and not processed by the responding station, and determine the channel information of the channel from the initiator to the responder in response to the feedback symbol.

* * * * *